Nov. 17, 1942.  G. G. HAVENS  2,302,027
PNEUMATIC TIRE
Filed Aug. 9, 1940
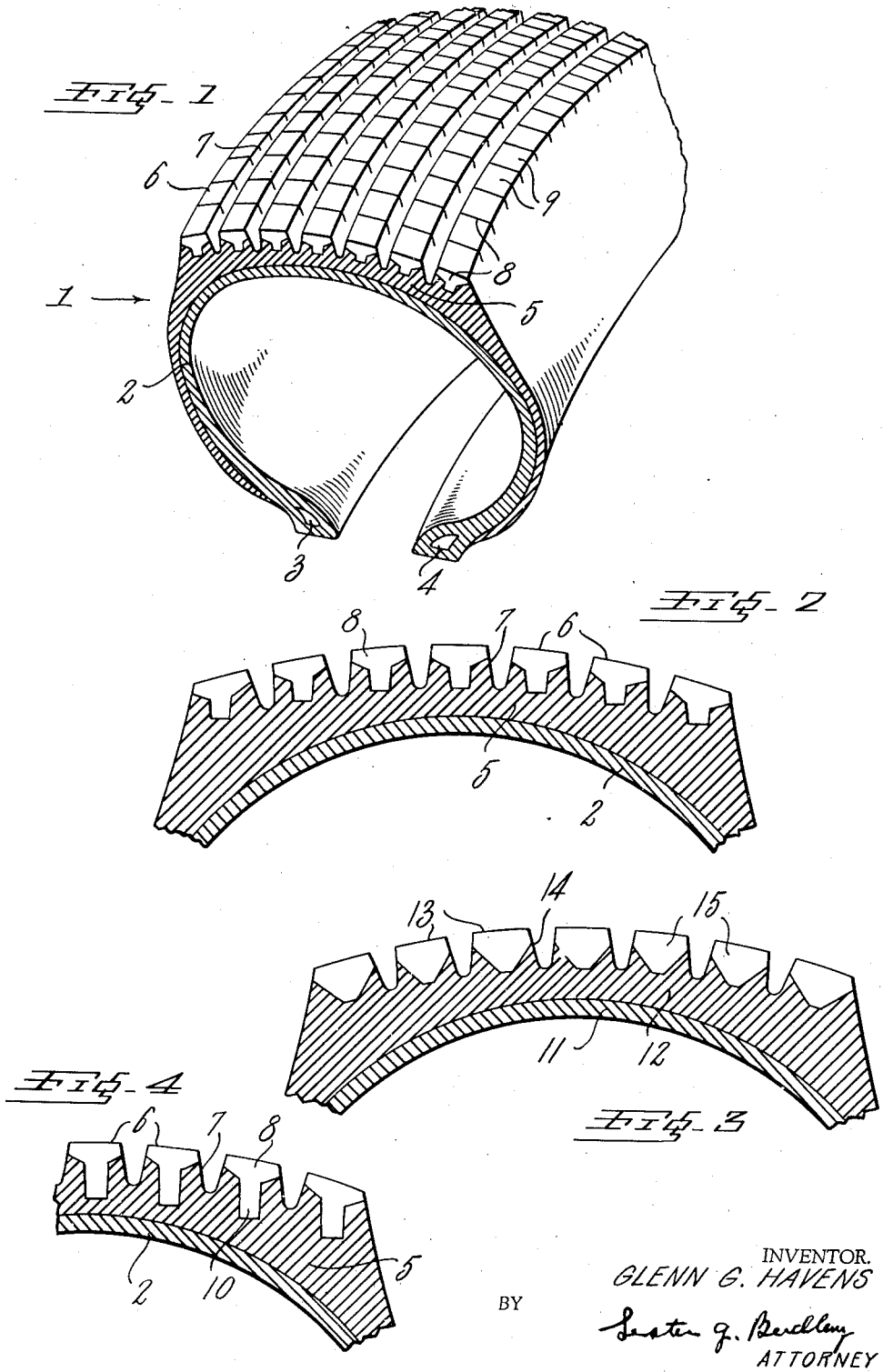
INVENTOR.
GLENN G. HAVENS
BY
Lester G. Berkley
ATTORNEY Patented Nov. 17, 1942

2,302,027

UNITED STATES PATENT OFFICE 2,302,027

PNEUMATIC TIRE

Glenn G. Havens, Detroit, Mich., assignor to United States Rubber Company, New York, N. Y., a corporation of New Jersey Application August 9, 1940, Serial No. 351,945

2 Claims. (Cl. 152—209)

This invention relates to pneumatic tires and, in particular, it relates to tires having slits extending transversely of the antiskid portion of the tire. More particularly, the invention relates to a pneumatic tire having a rubber composition tread forming a plurality of functionally continuous ribs and having slits extending transversely of the ribs for the full width thereof, with a depth equal to substantially one-half the height of the ribs and having a continued slit portion extending toward the base of the rib, the width of the continued slit being substantially less than the width of the slit at the road engaging surface of the tread.

In the manufacture of pneumatic tires, it is becoming customary to form slits extending transversely of the circumferentially extending antiskid elements in order to improve traction and antiskid qualities. Slits formed to the entire depth of the antiskid elements are sometimes objectionable because of the tendency of portions of the antiskid elements to tear loose from the tread proper. In order to prevent this condition, the depth of the slits is usually limited to substantially one-half the height of the antiskid elements. When a tire having half-depth slits is about half worn, it becomes necessary to re-slit the tread in order to preserve its original effectiveness. Vehicle owners are usually reluctant to remove the tires from their vehicles for the purpose of having the treads re-slitted because of the inconvenience it causes and the additional cost required for re-slitting.

In accordance with the practice of my invention, I have found that slits may be formed in a tire tread to the full depth of the antiskid elements, providing the width of the slits at the base of the tread elements is substantially less than the width at the road engaging surface. It is, therefore, among the objects of my invention to provide a pneumatic tire having slits formed in the tread portion thereof, in which the slits are effective throughout the life of the tire; to provide a slit formation in the tread of a pneumatic tire extending the full depth of the antiskid elements but which will not permit the tearing loose of portions of the antiskid elements; to provide a slit formation in the tread of a pneumatic tire which does not require re-slitting of the tread; and, to provide a slit formation in the tread of a pneumatic tire which may be formed efficiently and economically. These and other objects and advantages will appear more fully in the following detailed description when considered in connection with the accompanying drawing, in which:

Fig. 1 is a perspective view, in section, of a portion of a pneumatic tire embodying features of my invention;

Fig. 2 is a transverse view, in section, of a portion of a pneumatic tire illustrating in detail the shape of a slit formation;

Fig. 3 is a transverse view, in section, of a portion of a pneumatic tire illustrating a modified form of slits; and Fig. 4 illustrates a further modified form of slits.

Referring to the drawing and, in particular, to Fig. 1, I show a pneumatic tire 1 comprising essentially a carcass 2, bead wires 3 and 4, and a rubber composition tread portion 5. The tread portion 5 is divided into a plurality of functionally continuous ribs 6 defining a plurality of grooves 7. The ribs 6 are divided along their circumference by a plurality of slits 8 extending transversely of the ribs and radially of the tire. As a result of the presence of the slits 8, the ribs 6 are divided into a plurality of circumferentially extending functionally independent antiskid elements 9.

As shown more particularly in Fig. 2, the slits 8 are of varying width, the upper portion of the slit extending the full width of the rib 6, while the width of the lower portion is substantially less than the width of the rib. The upper portion of the slit 8 extends to a depth equal to not more than one-half of the height of the rib 6. The lower portion of the slit 8 extends to approximately the base of the rib 6, as defined by the base of the groove 7.

As shown by the numeral 10 in Fig. 4, the lower portion of the slit 8 may extend beyond the base of the ribs. For example, the lower portion of the slit 8 may extend to a point substantially midway between the base of the rib as defined by the grooves 7 and tire carcass 2. By this provision it is possible to obtain better antiskid and traction qualities, even though the tire is otherwise worn smooth.

In Fig. 3 I show a modified form of the invention in which is illustrated a portion of a tire carcass 11 and a rubber composition tread 12. Circumferentially extending ribs 13 as defined by grooves 14 are provided with slits 15 of a substantially V-shaped formation and having blunt apexes terminating at the base of the ribs and midway between the defining grooves 14. The V-shaped slits 15 are proportioned so that they extend transversely the full width of the ribs at their upper or road-engaging surfaces and to a depth not in excess of one-half the height of the ribs. From about the center of the rib height the slits 15 converge toward a blunt point midway of the width of the ribs defined by the grooves 14 and at the base of the ribs as defined by the base of the grooves.

While slits as thus described may be molded in the rubber composition, it is preferred that they be cut into the rubber composition by direct impact of a knife blade such as shown in the Wikle application, Serial No. 329,252, filed April 12, 1940.

Although the ribs of the tire tread are shown to be circumferentially continuous, it is to be understood that various antiskid tread patterns may be employed and that the effect of the slitting operation will improve the antiskid and traction qualities of the tread, notwithstanding variations in antiskid pattern. The combination of slits with antiskid elements is more satisfactory when the antiskid elements are at least functionally continuous.

While I have shown and described a preferred form of my invention, it is to be understood that it is susceptible of modifications, all of which I contemplate within the spirit of the invention and scope of the appended claims.

Having thus shown and described my invention, what I claim and desire to protect by Letters Patent is:

1. A pneumatic tire having a rubber composition tread forming a plurality of functionally continuous ribs, said ribs being defined by a plurality of grooves of substantial width and depth, the majority of said ribs being provided with a plurality of slits extending radially of the ribs from the road engaging surface of the ribs to substantially the bases of the ribs, the width of the slits at the road engaging surface of the tread being equal to the width of the ribs with a depth equal to approximately one-half of the height of the ribs, and the continuing portion of the slits extending radially and centrally of the ribs to substantially the bases of the ribs and having a width less than the width of the ribs.

2. A pneumatic tire provided with a tread including a circumferential rib having a plurality of transverse slits of configuration such that said slits extend inwardly from the road engaging surface the full width of the rib for a distance short of the base of the rib and are then continued further inwardly and centrally of the rib at diminished width to at least substantially the base of the rib.

GLENN G. HAVENS.